United States Patent [19]

Cathell

[11] 4,201,957
[45] May 6, 1980

[54] POWER INVERTER HAVING PARALLEL SWITCHING ELEMENTS

[75] Inventor: Franklin J. Cathell, San Diego, Calif.
[73] Assignee: Qualidyne Systems, Inc., Chula Vista, Calif.
[21] Appl. No.: 930,095
[22] Filed: Aug. 1, 1978

Related U.S. Application Data

[63] Continuation-in-part of Ser. No. 835,403, Sep. 21, 1977, Pat. No. 4,105,957.
[51] Int. Cl.² ........................ H02M 7/537; H03K 3/30
[52] U.S. Cl. ............................... 331/110; 331/113 A; 363/17; 363/132
[58] Field of Search ............. 331/113 A, 110; 363/17, 363/132, 136

[56] References Cited
U.S. PATENT DOCUMENTS
3,299,370  1/1967  Massey ............................ 331/110 X Primary Examiner—Siegfried H. Grimm
Attorney, Agent, or Firm—Lowe, King, Price and Becker

[57] ABSTRACT

A full wave bridge inverter includes four switch arms, each including N bipolar, parallel transistor switching elements. During a first interval, emitter-collector paths of all transistors in the first and second arms are forward biased so current flows in a first direction from a DC source through a bridge diagonal. During a second interval, emitter-collector paths of all transistors of the third and fourth arms are forward biased so current flows from the source through the diagonal in a second direction. The transistors have a tendency to be activated into the conducting and cut-off conditions at different times, and different transistors have a tendency to conduct differing amounts of current while forward biased. To overcome these tendencies, there are $2N^2$ transformers, each including first and second windings having like numbers of turns. The first windings of N of the transformers are connected in series with the emitter of the ith transistor of the first arm; the second windings of these N transformers are connected in series with the emitter-collector paths of each of the transistors of the second arm, where $i = 1, 2, \ldots, N$. Each first and second winding is connected to only one element of the first and second arms, respectively. Similar transformer connections exist between the transistors of the third and fourth arms.

12 Claims, 2 Drawing Figures

POWER INVERTER HAVING PARALLEL SWITCHING ELEMENTS

RELATION TO CO-PENDING APPLICATION

The present application is a continuation-in-part of my co-pending, commonly assigned application, Ser. No. 835,403, filed Sept. 21, 1977, entitled "Full Wave Bridge Power Inverter", now U.S. Pat. No. 4,105,957.

TECHNICAL FIELD

The present invention relates generally to DC to AC inverters employing switching transistors, and more particularly, to a DC to AC inverter including first and second series connected switch arms on opposite sides of a load, wherein each of the arms includes parallel connected switching elements.

BACKGROUND ART

As discussed in the co-pending application, DC to AC power inverters employing switching elements are well known in the art. In one typical configuration, four bi-polar switching transistors of like conductivity type are arranged as a full wave bridge inverter. Transistors in first and second switch arms of the bridge are connected in a first series circuit between a DC power source and a bridge diagonal that is connected to a load so that current flows in a first direction through the diagonal during the first time interval, while the transistors in the first and second arms are both forward biased. Third and fourth switch arms of the bridge include transistors that are connected in a second series circuit between the DC source and the diagonal so that current flows in a second direction through the diagonal during a second time interval while the transistors of the third and fourth arms are forward biased. Forward biasing of the transistors of the first and second arms occurs during a first half cycle of a time reference AC source, while the transistors of the third and fourth arms are forward biased during alternate, second half cycles of the time reference source. Typically, forward biasing is provided in an out-of-phase relationship by the AC source being coupled between the base and emitters of the transistors of the first and second arms, and of the third and fourth arms.

Because the switching transistors of each pair of arms are essentially in series while they are forward biased into conduction, it is advantageous for the switching transition times of these transistors to be the same. It is particularly advantageous for the cut-off times of transistors in each pair of arms to be the same. The necessity for simultaneous transition times of the switching transistors of each pair of arms can be obviated if the transistors have very high power ratings. However, it is not advantageous to provide transistors with excessively high power ratings because of cost, heat dissipation and size.

If transistors with low power ratings are employed, they should have simultaneous conduction and cut-off times for numerous reasons. In particular, if low power transistors are simultaneously activated into the forward biased condition, turn-on losses of both transistors of one pair of arms are equalized to provide equal heat losses in the transistors of the first and second arms and symmetrical heat sinking. Simultaneous turn-off times of the transistors of a pair of arms distribute turn-off losses equally between the transistors. If the transistor of one arm turns off appreciably before the transistor of another arm, there is unequal power dissipation. If the transistor in one arm turns off first, that arm must sustain the full turn off switching loss. The transistor in the arm which is slower to turn off has essentially no dissipation during turn-off because the current through it is interrupted by the turn-off of the faster transistor. Equalizing the turn-on and turn-off times of the transistors of a pair of arms greatly reduces switching noise and transients. If the transistors of two series arms are simultaneously turned on and turned off, the inductive open circuit emitter-collector voltage of each transistor can be materially reduced; the inductive voltage being due to a collapsing magnetic field of the transformer in the diagonal.

It is difficult to obtain inexpensive, off-the-shelf transistors that are matched to have characteristics so that they are simultaneously activated into a conducting state and deactivated into a cut-off state. Of course, matched transistors, i.e., those having desired characteristics, exist, but the price of matched transistors is significantly greater than the price of unmatched, or off-the-shelf transistors. If high current capability is required, as can be achieved by employing parallel transistors, the difficulties in achieving matching between many transistors is appreciably greater than matching characteristics of only a pair of transistors.

In the co-pending application, the turn-on and turn-off times of a pair of unmatched, low power transistors in the two series circuits of a full wave bridge inverter are forced to be substantially the same by transformer coupling the emitters of the transistors in each pair to each other. A first transformer includes first and second windings connected as series elements of the first series circuit. Terminals of the first and second windings of the first transformer are respectively connected to the emitters of the two transistors of the first series circuit. A second transformer includes third and fourth windings connected as series elements of the second series circuit. The third and fourth windings have terminals respectively connected to the emitters of the third and fourth transistors. To provide the simultaneous turn-on and turn-off times, the windings of the first and second transistors are arranged so that the emitter voltages of the first circuit have a tendency to vary in the same direction, and the emitter voltages of the transistors of the second circuit have a tendency to vary in the same direction.

By activating the transistors of each circuit simultaneously into conducting and cut-off conditions, there are equalizations of the turn-on and turn-off losses of both transistors in a particular series circuit. Further, the needs for matched transistors, transistors having high emitter-collector sustaining voltages, or transistors having high power ratings is obviated. By activating the transistors simultaneously into the cut-off and conducting states, noise and transients are materially reduced, which also helps to lower the current ratings of back biased diodes that shunt the emitter-collector paths of each of the transistors. The shunt diodes absorb inductive voltages which might otherwise exist between the emitter and collector of the transistors as they turn off.

While the prior art bridge power inverter described in my co-pending application functions admirably for many situations, there are other, high power situations wherein a single transistor cannot supply adequate current to a high power load. It is well known that the current capability of a single transistor can be increased by connecting several transistors in parallel, so that the emitter-collector paths thereof are in parallel, and the bases of all of the transistors are connected to be biased by a common source. The parallel transistor connection is advantageous because, in many cases, the price of two relatively low power transistors is less than that of a single high power device. However, there are numerous problems associated with connecting unmatched parallel switching transistors to each other. In particular, the different parallel transistors have a tendency to have: (1) differing load currents flowing between the emitter and collector electrodes thereof, and (2) unequal turn-on and turn-off times. The unequal load current amplitudes cause uneven power dissipation in the different parallel connected transistors, and frequently in the eventual destruction of the inverter, as dissipation becomes greater. To obviate the problem of uneven power dissipation, it has been common to employ emitter "ballast" resistors. However, the use of ballast resistors is inefficient, because of the power consumed by the resistors; further, the ballast resistors do not eliminate the turn-on and turn-off switching problems and may have a tendency to increase these problems. The unequal turn-on and turn-off times of the parallel, switching transistors cause excessive power dissipation for the transistor which has a tendency to turn on first and excessive power dissipation for the transistor which has a tendency to turn off last. The excessive power dissipation occurs for these transistors because they have to carry most of the current during the period that the other transistors are not fully conducting.

It is, accordingly, an object of the present invention to provide a new and improved circuit for switching current from a DC source to AC current which is to be supplied to a load by employing switching elements that are connected in parallel with each other and which are simultaneously activated into conducting and cut-off states.

A further object of the invention is to provide a new and improved DC to AC inverter employing switching transistors that are connected in parallel with each other, wherein the transistors are substantially simultaneously rendered into conducting and cut-off states, and the current flowing through each of the transistors, while conducting, is approximately the same.

A further object of the invention is to provide a new and improved DC to AC inverter employing a pair of simultaneously energized switches that are connected to opposite electrodes of a DC source and to opposite terminals of an AC load, wherein each switch includes a plurality of parallel, unmatched elements that are substantially simultaneously activated into conducting and cut-off states, and which have approximately equal currents flowing through them while conducting.

A further object of the invention is to provide a new and improved DC to AC power inverter bridge, wherein each arm of the bridge includes a plurality of parallel, unmatched switching elements, and wherein the elements of a first pair of arms of the bridge are simultaneously activated into conducting and cut-off states, and the elements of third and fourth arms of the bridge are simultaneously activated into conducting and cut-off states, with the current flowing through each of the elements, while in the conducting state, being approximately the same.

DISCLOSURE OF THE INVENTION

In accordance with the present invention, a circuit for switching current from a DC source to AC current to be supplied to a load includes a DC series circuit having a first switch arm connected between one terminal of the source and one terminal for the load, as well as a second switch arm connected between a second terminal for the load and a second terminal of the source. Each of the switch arms includes N parallel switching elements, each having a control electrode, an input electrode, and an output electrode. Each of the elements is rendered into a conducting condition between the input and output electrodes thereof in response to the voltage of the control electrode being a predetermined amount greater than the voltage of the first electrode, and into a cut-off condition between the input and output electrodes thereof in response to the voltage of the control electrode being a predetermined amount less than the voltage of the first electrode. In the preferred embodiment, the switching elements are like conductivity type bipolar transistors. A time reference biasing signal is simultaneously applied to all of the switching elements of the first and second switch arms so that these elements have a tendency to be simultaneously biased into conducting and cut-off conditions.

Because the elements need not be and are not usually matched, different ones of the elements have a tendency to be activated into the conducting and cut-off states at different times in response to the biasing signal. The tendency of different ones of the elements to be activated at different times is overcome by coupling current flowing through the ith element of the first switch arm with current flowing through the ith element of the second switch, where i equals 1, 2, ..., N. Because the switching elements are not matched, they also have a tendency to conduct different amounts of current while in the conducting state. The tendency for the different elements to conduct different amounts of current while in the conducting state is overcome by cross coupling current flowing through the ith element of the first switch arm with current flowing through each of the elements of the second switch arm, where i equals 1, 2, ..., N.

In a preferred embodiment, the current is coupled between the elements of the first and second switch arms by $N^2$ transformers, each having first and second windings. The first windings of N of the transformers are connected in series with each other and one of the parallel switch elements of the first switch arm. The second windings of the N transformers are connected in series with a different element of the second switch arm. Similar connections exist between the first windings and the remaining elements of the first and second switch arms. Thereby, in general, the first windings of N of the transformers are connected in series with each other and the ith element of the first switch arm so each first winding is connected to only one element of the first arm, where i=1, 2, ..., N. The second windings of N of the transformers are connected in series with the jth parallel switch element of the second switch arm so each second winding is connected to only one element of the second switch, where j=1, 2, ..., N. The first and second windings of each of the $N^2$ transformers are connected with each other so that the voltages at the input electrodes of the switching elements to which they are connected have a tendency to vary in the same direction in response to the induced voltages therein.

Preferably, the present invention is employed in a full wave bridge inverter including four switch arms arranged so that current flows in a first direction through a diagonal of the bridge in response to the elements of the first and second arms being simultaneously forward biased. Current flows through the bridge diagonal in a second direction in response to the elements of the third and fourth arms of the bridge being simultaneously forward biased, while the transistors of the first and second arms are back biased. In each of the arms, parallel switching elements are provided, so that the elements in the first and second arms are simultaneously conducting during a first interval, while the elements in the third and fourth arms are simultaneously cut-off and vice-versa during a second interval. Equalization of the turn-on and turn-off times of the elements of the first and second arms, and turn-on and turn-off equalization of the elements of the third and fourth arms is provided by coupling currents between the parallel elements of the first and second arms, and coupling currents between the parallel elements of the third and fourth arms. Current equalization in the elements of the different arms is obtained by cross coupling currents of the first and second arms and cross coupling currents of the third and fourth arms.

In the bridge situation, each of the arms includes N parallel switching elements, so that in the bridge there are $2N^2$ transformers, each having first and second windings. The windings of the several transformers are such that the first and second windings are opposed with respect to current flow, i.e., the transformers act like baluns. Any difference in the current flowing between the first and second windings of any particular transformer causes an equalization of base current in the transistors to which the transformer is connected, in such a way as to turn the transistor on harder or tend to turn it off, until the currents of the balun transformers are substantially equalized. The balun action of the transformer enables the switching elements to be simultaneously switched into and out of the conducting state and to provide equalization of the current flow in the different transistor switching elements of each switch.

The above and still further objects, features and advantages of the present invention will become apparent upon consideration of the following detailed description of several specific embodiments thereof, especially when taken in conjunction with the accompanying drawing.

BEST MODE FOR CARRYING OUT THE INVENTION

Figure 1:
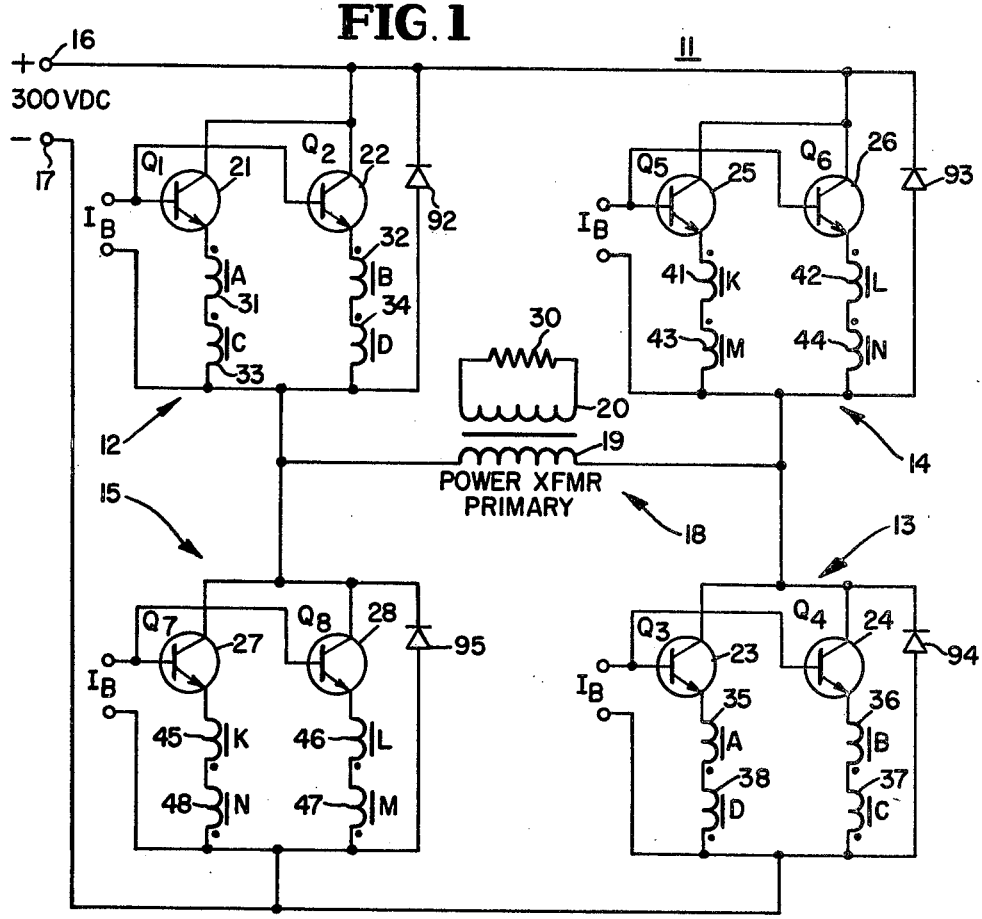
FIG. 1 is a circuit diagram of an embodiment of the invention wherein each arm of a four-way bridge includes two parallel transistors.

Reference is now made to FIG. 1 of the drawing wherein there is illustrated a full wave bridge inverter 11, including four switch arms 12, 13, 14 and 15, each of which includes two parallel, bi-polar NPN switching transistors 21–28 that form switching elements. Bridge inverter 11 is powered by a suitable DC source, such as a 300-volt source, connected between positive terminal 16 and negative terminal 17. Bridge 11 includes a diagonal 18 containing transformer primary winding 19 that is inductively coupled to a load circuit 20. The load in circuit 20 can be an AC load or a rectifier, if the circuit is utilized for DC to AC to DC conversion.

A time reference source (not shown) is connected to the base of transistors 21–28 so that the transistors in arms 12 and 13 are forward biased during one half cycle of the time reference source, while the transistors in arms 14 and 15 are back biased; the transistors in arms 14 and 15 are forward biased during the other half cycle of the time reference source, while the transistors in arms 12 and 13 are back biased. While the transistors in arms 12 and 13 are forward biased, current flows from terminal 16 of the DC source through the emitter-collector paths of transistors 21 and 22 of arm 12, through diagonal 18 from left to right (as illustrated), and through the emitter-collector paths of transistors 23 and 24 of arm 13 to terminal 17. While the transistors of arms 14 and 15 are forward biased, current flows from terminal 16 through the emitter-collector paths of transistors 25 and 26, through diagonal 18 from right to left, and through the emitter-collector paths of transistors 27 and 28 to terminal 17.

Hence, during alternate half cycles of the time reference source, current flows in opposite directions through diagonal 18 so that AC voltage is supplied to load circuit 20. Due to the nature of the current flow through arms 12–15, arms 12 and 13 are considered to be in a first series circuit during one half cycle of the time reference source, while arms 14 and 15 are considered as being in a second series circuit during the other half cycle of the time reference source. Diagonal 18 is connected to each of the series circuit so that current flows in opposite directions through it via the two series circuits.

The previously described circuit is well known in the art. However, the problem with the prior art circuit is that transistors of the two series circuits do not necessarily turn on and turn off simultaneously, and that current flow and switching times of the parallel transistors of each arm are generally not equal, unless expensive matched transistors are employed throughout. If the transistors do not turn on and off simultaneously, transistors having high power ratings must be employed. If the turn-on and turn-off times of the paralleled transistors in arms 12 and 13 differ from each other, or the turn-on and turn-off times of the paralleled transistors in arms 14 and 15 differ from each other, the fastest transistors must momentarily carry the full load current when they turn on, while the slowest transistors momentarily carry the full load current during turn off. Hence, there are unequal losses and momentary high current stresses in the transistors of arms 12 and 13 and of arms 14 and 15. In addition, the current sharing of the paralleled transistors will be uneven unless dissipative emitter "ballast" resistors are used.

Because the transistors in each series circuit turn on and turn off at different times, current transitions through the transistors occur at different times, resulting in uneven switching losses, considerable switching noise and transients.

In accordance with the present invention, these problems with the prior art are obviated by providing a new and improved circuit that causes the transistors of arms 12 and 13 to be turned on and turned off simultaneously and forces current flow through transistors 21–24 during the conducting interval, and causes the transistors in arms 14 and 15 to be simultaneously activated into the conducting and cut-off states and forces transistors 25-28 to have substantially equal current flow during the conducting interval. The improved circuit of FIG. 1 employs eight current transformers A-D and K-N; transformers A-D are employed in arms 12 and 13, while transformers K-N are employed in arms 14 and 15. Transformers A,B,C and D respectively include first windings 31, 32, 33 and 34, and second windings 35, 36, 37 and 38; transformers K, L, M and N respectively include first windings 41, 42, 43 and 44, and second windings 45, 46, 47 and 48. The number of turns in all of the windings is the same, preferably two, and there is tight coupling between the first and second windings of each transformer to enable transistors 21-28 to have a relatively low emitter-collector cut-off voltage rating.

Windings 31 and 33 of transistors A and B are connected in series with each other and the emitter-collector path of transistor 21, while first windings 32 and 34 of transformers B and D are series connected with each other and the emitter-collector path of transistor 22. Windings 35 and 38 of transformers A and D are series connected with each other and emitter-collector path of transistor 23, while windings 36 and 37 of transformers B and C are connected in series with each other and the emitter-collector paths of transistor 24. Thereby, current flowing through the emitter-collector path of transistor 21 is coupled by transformers A and C to the emitter-collector paths of transistors 23 and 24 by windings 35 and 37, respectively. Similarly, current flowing through the emitter-collector path of transistor 22 is coupled by windings 32 and 34 of transformers B and D to the emitter-collector paths of transistors 24 and 23 by windings 36 and 38, respectively.

The windings of transformers A-D and K-N are connected to the emitters of transistors 21-28 and are arranged so that the currents in the first winding have a tendency to buck the currents in the second windings, as indicated by the dot convention. Hence, if there are unequal currents flowing in transistors 21 and 23, whereby the current in transistor 21 is greater than the current in transistor 23, the current flowing through winding 31 increases the current in winding 35, whereby transistor 23 has a tendency to be more forward biased and to conduct more heavily. Hence, the transformer coupling between windings 31 and 35 tends to cause transistors 21 and 23 to turn on and turn off simultaneously.

The cross coupling between the various transformer windings assures equal current conduction through transistors 21-24 during the half cycle while these transistors are forward biased. Because each of windings 31-38 and 41-48 includes the same number of turns, the effective current change in the emitter-collector paths of transistors 21-28 is identical in response to the coupled currents between the first and second windings of each transformer. Hence, each of transformers A-D and K-N functions similarly to a balun so that any difference of current flow between the first and second windings of each transformer increases or decreases the base current in the transistors to which the transformer windings are connected. The change in the base current causes the transistor which has the lower emitter-collector current to be driven more towards saturation so that the emitter-collector current thereof increases. This action occurs simultaneously in all of the transformers that are connected to the conducting transistors to force the balun transformer currents to be equalized.

The balun action of transformer A causes the simultaneous switching times of transistors 21 and 23, while the balun action of transformer B causes simultaneous switching times of transistors 22 and 24. To assure equalization of currents flowing in transistors 21 and 24, the current flowing through transistor 21 is coupled to transistor 24 by way of windings 33 and 37 of transformer C, while a similar result is provided for transistors 22 and 23 by windings 34 and 38 of transformer D.

The overall resulting action is that transistors 21-24 all conduct equal load currents and switch on and off simultaneously. Thereby, power dissipation is equalized amongst all of the parallel switching elements of the switches comprising arms 12 and 13. Further, transistors 21-24 do not need to be matched to have the same storage and fall times because the circuit automatically equalizes these times. A similar result is achieved by transformers 41-48 whereby equal currents flow through transistors 25-28 and these transistors are simultaneously activated and sumultaneously deactivated.

As in the prior art, it is preferable to employ back biased diodes 92-95 in shunt with the switching elements of arms 12-15, respectively. Diodes 92-95 do not merely shunt the emitter-collector paths of their respective switching transistors, but also shunt the series transformer windings that are connected to the emitters of the respective transistors. This allows ONLY 4 diodes to be used in the bridge instead of a diode in shunt with each transistor.

Figure 2:
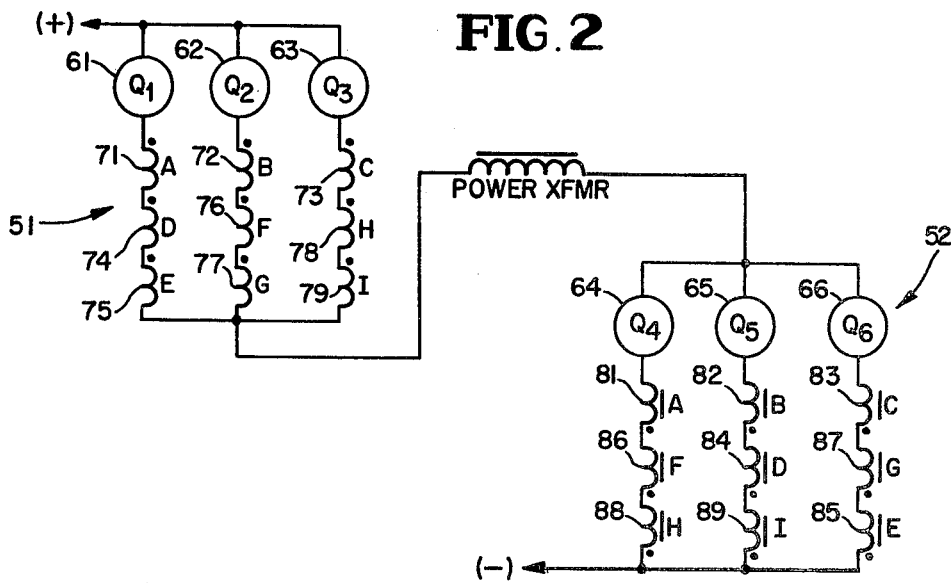
FIG. 2 is a partial circuit diagram of a second embodiment of the invention, specifically illustrating the transformer connections for a pair of arms, each of which includes three switching transistors connected in parallel.

The principles of the present invention can be expanded to include a bridge wherein each arm includes any number of equal transistors, with an equal number of transformer windings connected in series with each of the parallel transistors. In FIG. 2 there is illustrated the transformer connections for a pair of series connected arms 51 and 52, each of which includes three switching transistors 61, 62 and 63, and 64, 65 and 66, respectively. Associated with arms 51 and 52 are nine transformers A-I, each including first and second windings, each having the same number of turns. The first windings 71, 74 and 75 of transformers A, D and E are respectively connected in series with each other and the emitter collector path of transistor 61, while the second windings 81, 84 and 85 of these transformers are connected in series with the emitter-collector paths of transistors 64, 65 and 66, respectively. First windings 72, 76 and 77 of transformers B, F and G are respectively connected in series with each other and the emitter-collector path of transistor 62, while the second windings 82, 86 and 87 of these transformers are connected in series with the emitter-collector paths of transistors 65, 64 and 66, respectively. Similarly, the first windings 73, 78 and 79 of transformers C, H and I are respectively connected in series with each other and the emitter-collector path of transistor 63, while the second windings 83, 88 and 89 of these transformers are connected in series with transistors 66, 64 and 65, respectively.

Because of the connections of windings 71, 74 and 75 to transistors 61 and the connections of windings 81, 84 and 85 to transistors 64, 65 and 66, the currents through transistors 64-66 have a tendency to be equalized, despite the mismatched properties of these transistors. Because of the coupling between transformers 71 and 81, the turn-on and turn-off times of transistors 61 and 64 have a tendency to be equalized.

If even greater current capability is required, the number of transistors in each arm of the bridge can be expanded further, whereby there may be sixteen, twenty or more transistors in a full wave inverter bridge. Such an increase in the number of transistors is accompanied by an increase in the number of cross coupling balun transformers to assure equal currents and simultaneous switching times of the different transistors.

In general, if each arm of the bridge includes N parallel transistor switching elements, where N is an integer greater than 1, N transformer windings are connected in series with each of the switching transistor elements of a particular arm. Hence, associated with switch arms 51 and 52, or arms 12 and 13 are $N^2$ transformers having first and second windings. The first windings of N of the transformers are connected in series with each other and the ith parallel switch element of the first switch arm (arm 12 or 51) so each first winding is connected to only one element of the first arm, where $i=1, 2, \ldots, N$. The second windings of N of the transformers are connected in series with the kth switch element of the second switch arm (arm 13 or 52) so each second winding is connected to only one element of the second arm, where $k=1, 2, \ldots, N$.

While there has been described and illustrated several specific embodiments of the invention, it is clear that variations in the details of the embodiments specifically illustrated and described may be made without departing from the true spirit and scope of the invention as defined in the appended claims.

I claim:

1. An inverter for converting power from a DC source to AC source that is supplied to a load comprising first, second, third and fourth switch arms, each of said switch arms including a plurality of parallel switch elements, each having a control terminal, an input terminal and an output terminal, each of the elements being activated into conducting and non-conducting states between the input and output terminals in response to the voltage magnitude between the control and input terminals having values in first and second ranges, respectively; means for connecting said switch arms in a bridge circuit with the source and load, said bridge circuit including a diagonal to which the load is adapted to be connected; the input and output terminals of the elements of said first and second switch arms being in a first series circuit with each other, terminals for the source, and the diagonal so that current flows in a first direction through the diagonal and between the input and output terminals of the elements of the first and second switch arms in response to the elements of the first and second switch arms both being closed; the input and output terminals of the elements of said third and fourth switch arms being connected in a second series circuit with each other, the source terminals and the diagonal, so that current flows in a second direction through the diagonal between the input and output terminals of the elements of the third and fourth switch arms in response to the elements of the third and fourth switch arms being closed; first activating means for simultaneously activating the elements of the first and second switch arms into conducting and cut-off states during a first time interval, second activating means for simultaneously activating the elements of the third and fourth switch arms into conducting and cut-off states during a second time interval; said first activating means including: (a) first bias means for respectively biasing the control terminals of the elements of the first and second switch arms relative to the input terminals of the first and second switch arms, said elements of the first and second switch arms being likely to have dissimilar characteristics in response to the voltages biasing the control terminals thereof so that one element of the first and second switch arms has a tendency to conduct and cut off prior to another element of the first and second switch arms in response to the biasing voltages therefor, and (b) first coupling means for coupling currents between the inputs terminals of the elements of the first and second switch arms, said first coupling means being arranged so that in response to any of the elements of the first or second switch arms being rendered into one of the current conducting and cut-off states, the other elements of the first and second switch arms are supplied with voltages tending to activate them into a like state and substantially overcome the tendency for the elements of the first and second switch arms to conduct and cut off at different times; said second activating means including: (a) second bias means for respectively biasing the control terminals of the elements of the third and fourth switch arms relative to the input terminals of the elements of the third and fourth switch arms, said elements of the third and fourth switch arms being likely to have dissimilar characteristics in response to the voltages biasing the control terminals thereof so that one element of the third and fourth switch arms has a tendency to conduct and cut off prior to another element of the third and fourth arms in response to the biasing voltages therefor, and (b) second coupling means for coupling currents between the input terminals of the elements of the third and fourth switch arms, said second coupling means being arranged so that in response to any of the elements of the third or fourth switch arms being rendered into one of the current conducting and cut-off states, the other elements of the third and fourth switch arms are supplied with voltages tending to activate them into a like state and substantially overcome the tendency for the elements of the third and fourth switches to conduct and cut off at different times.

2. The inverter of claim 1 wherein the first coupling means includes a plurality of first transformers having first and second windings, each element of the first arm being connected in series with at least two of the first windings, each element of the second arm being connected in series with at least two of the second windings, the second coupling means including a plurality of second transformers having third and fourth windings, each element of the third arm being connected in series with at least two of the third windings, each element of the fourth arm being connected in series with at least two of the fourth windings.

3. The inverter of claim 2 wherein each of the switch elements is a bipolar transistor of the same conductivity type.

4. The inverter of claim 3 further including first, second, third and fourth back biased diodes respectively connected in shunt with the transistors of said first, second, third and fourth arms.

5. The inverter of claim 3 further including first, second, third and fourth back biased diodes respectively connected in shunt with the series combinations of each of the transistors and windings of the first, second, third and fourth arms.

6. The inverter of claim 1 wherein each of the arms includes N elements, where N is an integer greater than one, the first coupling means including: $N^2$ first transformers, each having first and second windings, the first windings of N of the first transformers being connected in series with each other and the input and output electrodes of the ith element of the first arm, each first winding being connected to only one element of the first arm, where i=1, 2, ..., N, the second windings of N of the first transformers being connected in series with each other and the input and output electrodes of the ith element of the second arm, each second winding being connected to only one element of the second arm; the second coupling means including: N² second transformers, each having third and fourth windings, the third windings of N of the second transformers being connected in series with each other and input and output electrodes of the kth element of the third arm, where k=1, 2, ..., N, each third winding being connected to only one element of the third arm, the fourth windings of N of the second transformers being connected in series with each other and input and output electrodes of the kth element of the fourth arm, where k=1, 2, ... N, each fourth winding being connected to only one element of the fourth arm.

7. An inverter for converting power from a DC source to AC power that is supplied to a load comprising first, second, third and fourth sets of bipolar transistors of like conductivity type, each of said transistors having a base, emitter and collector, each set of transistors including N transistors having parallel connected emitter-collector paths and parallel connected bases, where N is an integer greater than one, means for connecting said sets of transistors in a bridge circuit with the source and load, said bridge circuit including a diagonal to which the load is adapted to be connected, the emitter-collector paths of the transistors in the first and second sets being connected in a first series circuit and with the diagonal so that current flows in a first direction from the source through the diagonal while the transistors of the first and second sets are forward biased, the emitter-collector paths of the transistors of the third and fourth sets being connected in a second series circuit and with the diagonal so that current flows in a second direction from the source through the diagonal while the transistors of the third and fourth sets are forward biased, N² first transformers, each of said first transformers having first and second inductively coupled windings connected as series elements of the first series circuit, said first and second windings respectively having a terminal connected in series with the emitters of the transistors of the first and second sets so that each of the first and second windings is connected in series with only one of the paths of the first and second set, said first and second windings being wound so that the voltages at the emitters of the transistors of the first and second sets have a tendency to vary in the same direction, N² second transformers, each of said second transformers having third and fourth inductively coupled windings connected as series elements of the second series circuit, said third and fourth windings respectively having a terminal connected in series with the emitters of the transistors of the third and fourth sets so that each of the third and fourth windings is connected in series with only one of the paths of the third and fourth sets, said third and fourth windings being wound so that the voltages at the emitters of the transistors of the third and fourth set have a tendency to vary in the same direction.

8. A circuit for switching current from a DC source to AC current to be supplied to a load comprising a DC series circuit including a first switch arm connected between one terminal of the source and one terminal for the load, a second switch arm connected between a second terminal for the load and a second terminal of the source, each of said switch arms including N parallel switching elements, each having a control electrode, an input electrode, and an output electrode, each of said elements being rendered into a conducting condition between the input and output electrodes thereof in response to the voltage of the control electrode being a predetermined amount greater than the voltage of the input electrode, and into a cut-off condition between the input and output electrodes thereof in response to the voltage of the control electrode being a predetermined amount less than the voltage of the input electrode, means for simultaneously applying a biasing signal to all of the switching elements so that the elements have a tendency to be simultaneously biased into conducting and cut-off conditions, different ones of said elements having a tendency to be activated into the conducting and cut-off states at different times in response to the biasing signal, means for overcoming the tendency of different ones of said elements to be activated at different times, said means for overcoming including means for coupling current flowing through the ith element of the first switch arm with current flowing through the ith element of the second switch arm, where i=1, 2, ..., N.

9. The circuit of claim 8 wherein the current coupling means comprises N transformers having first and second windings respectively connected in series with the N elements of the first and second arms, each first winding being connected to only one element of the first arm, each second winding being connected to only one element of the second arm.

10. The circuit of claim 9 wherein each element is a bipolar transistor of the same conductivity type.

11. A circuit for switching current from a DC source to AC current to be supplied to a load comprising a DC series circuit including a first switch arm connected between one terminal of the source and one terminal for the load, a second switch arm connected between a second terminal for the load and a second terminal of the source, each of said switch arms including N parallel switching elements, each having a control electrode, an input electrode and an output electrode, each of said elements being rendered into a conducting condition to have a tendency to conduct different amounts of current between the input and output electrodes thereof in response to the voltage of the control electrode being a predetermined amount greater than the voltage of the input electrode, and each of said elements being rendered into a cut-off condition between the input and output electrodes thereof in response to the voltage of the control electrode being a predetermined amount less than the voltage of the input electrode, means for simultaneously applying a biasing signal to all of the switching elements so that the elements have a tendency to be simultaneously biased into conducting and cut-off conditions, differents ones of said elements having a tendency to be activated into the conducting and cut-off states at different times in response to the biasing signal, means for overcoming the tendencies of different ones of said elements to be activated at different times and for different ones of said elements to conduct different amounts of currents, said means for overcoming including means for coupling current flowing through the ith element of the first switch arm with current flowing through each of the elements of the second switch arm, where i=1, 2, ..., N.

12. The circuit of claim 11 wherein the current coupling means comprises $N^2$ transformers each having first and second windings, the first windings of N of the transformers being connected in series with each other and the ith element of the first arm, each first winding being connected to only one element of the first arm, where i=1, 2, ... N, the second windings of N of the transformers being connected in series with each other and the jth element of the second arm, each second winding being connected to only one element of the second arm, where j=1, 2, ..., N.

* * * * *